United States Patent Office 3,446,586
Patented May 27, 1969

3,446,586
PURIFICATION OF HYDROGEN CHLORIDE
David M. Young, Sarnia, Ontario, Canada, assignor to The Dow Chemical Company, Midland, Mich., a corporation of Delaware
No Drawing. Filed Dec. 19, 1966, Ser. No. 602,463
Int. Cl. C01b 7/08; C07c 17/08
U.S. Cl. 23—154          7 Claims

ABSTRACT OF THE DISCLOSURE

Hydrogen chloride contaminated with minor amounts of unsaturated organic impurities such as that derived from the thermal dehydrochlorination of ethylene dichloride is contacted in the vapor phase with anhydrous aluminum chloride at 0–100° C. and under superatmospheric pressure to convert the unsaturated contaminants to the corresponding saturated chlorides. These chlorides can be removed by adsorption on activated carbon or by other suitable means to produce a highly purified hydrogen chloride.

---

This invention relates to an improved method for making highly purified hydrogen chloride. It relates particularly to a method whereby an impure hydrogen chloride stream derived from the thermal cracking of ethylene dichloride can be freed from certain unsaturated impurities.

The hydrogen chloride byproduct stream from the cracking of commercial ethylene dichloride to vinyl chloride contains a number of gaseous impurities which can be removed in large part by conventional procedures. The partially purified material thereby obtained is suitable as a technical grade of hydrogen chloride for many uses, in which the minor quantities of remaining impurities are inert or can be disregarded as insignificant. However, it has been considered to be economically impractical to purify this stream further to the point where essentially no impurities remain, thereby making this byproduct stream a source of super-pure hydrogen chloride. The impurities present in such a stream after ordinary separation and purification procedures consist essentially of the saturated and unsaturated hydrocarbons methane, ethane, acetylene, and ethylene present in contaminating amounts, i.e., a total hydrocarbon concentration of no more than one percent by volume. Traces of saturated and unsaturated chlorinated hydrocarbons may also be present. The unsaturated hydrocarbons acetylene and ethylene normally constitute the bulk of the total hydrocarbon impurities, running about 0.01–0.5 percent of the stream. Of these, acetylene is usually the major contaminant.

Economically practical removal of such impurities presents a difficult problem. The saturated hydrocarbons can be separated by a low temperature distillation and the traces of chlorinated hydrocarbons often present can be adsorbed on activated charcoal, but neither of these procedures is adequate for the required essentially complete removal of acetylene and ethylene and vinyl chloride in order to make a high purity hydrogen chloride. Such hydrogen chloride has been made in the past by the direct combustion of hydrogen in chlorine.

It has now been found that a hydrogen chloride stream containing minor amounts of unsaturated hydrocarbon contaminants such as that derived from the thermal dehydrochlorination of ethylene dichloride as described above can be purified and the olefinic and acetylenic hydrocarbons and the unsaturated monochloro derivatives thereof can be removed essentially completely by a process which comprises contacting that stream in the gas phase and under essentially anhydrous conditions with solid aluminum chloride at a temperature of about 0–100° C. Under these conditions, acetylene, ethylene and vinyl chloride have been found, surprisingly, to react with the hydrogen chloride to the point where they are converted essentially entirely to ethylidene chloride and ethyl chloride. These chlorinated hydrocarbons, plus any traces of such compounds originally present in the gas stream, are then removable by conventional means, such as contacting the effluent reacted stream with activated charcoal, by low temperature distillation or other suitable means. By this process, the concentrations of unsaturated hydrocarbons and chlorinated hydrocarbons in the treated hydrogen chloride can be reduced to less than 50 parts per million and if desired, to less than one part per million, thereby making available the above byproduct stream as a new and cheaper source of pure anhydrous hydrogen chloride.

Although this purification process is primarily useful in purifying the impure hydrogen chloride obtained from the cracking of ethylene dichloride, it is obviously applicable to any such hydrogen chloride product containing similar contaminating amounts of olefinic and acetylenic hydrocarbon impurities, particularly those of 2–3 carbon atoms, and their monochloro derivatives. In other words, a hydrogen chloride stream containing methylacetylene, allene, or propylene and their monochloro derivatives, with or without the additional presence of acetylene and ethylene with a total hydrocarbon concentration of 0.01–1 percent, is also effectively purified by the present process.

It is known that ethylene and acetylene can be reacted with hydrogen chloride in the presence of a metal halide catalyst to produce the corresponding adducts. For example, acetylene is reacted with hydrogen chloride on a commercial scale in the presence of a mercuric chloride catalyst to produce vinyl chloride and ethylidene chloride. Another commercial process involves the liquid phase reaction of ethylene with hydrogen chloride in the presence of aluminum chloride to make ethyl chloride. The present process has several points of difference from these known processes. For example, the present process is carried out in the gas phase throughout and it can be operated at ambient temperature to the practical extinction of the unsaturated impurities. Known gas phase reactions of this type are usually operated at elevated temperatures and even under such conditions, the conversions obtained are often less than fifty percent of the theoretical. The essential completion of hydrochlorination and the moderate reaction conditions required to obtain this result in the present process, therefore, are unexpected and could not have been predicted from the prior art.

Temperature of 0–100° C. can be employed for the hydrogen chloride reaction, but it is usually preferred to carry out this reaction at about normal ambient temperature, that is, about 10–40° C. The reaction takes place to some extent at any pressure. However, essential completion of the reaction is necessary to the practical operation of the present process. It has been found that such essentially complete conversion is obtained at superatmospheric pressures, preferably of at least five atmospheres. At the preferred temperature range mentioned, reaction pressures of 8–50 atmospheres are particularly preferred, the combination of pressure and temperature being such that the hydrogen chloride is in the gas phase. Contact times suitable to obtain complete reaction are dependent upon pressure and temperature conditions; also upon the amount, activity and state of subdivision of the catalyst. Contact times of at least 5 seconds are suitable. Within the preferred limits of pressure and temperature as described above and using smaller than 20 mesh aluminum chloride dispersed on glass wool, contact times of 10–600 seconds are sufficient, calculated on the basis of the empty column.

The aluminum chloride catalyst can be $AlCl_3$ powder or granular solid $AlCl_3$ as such or it can be deposited on, dispersed on or mixed with an inert support or filler, for example, alumina, glass, silica, asbestos, or the like. The aluminum chloride must be substantially anhydrous.

The chlorinated hydrocarbons can be removed from the resulting reaction mixture by suitable conventional means as set forth above. Selective adsorption on activated carbon is a preferred method. Such an adsorption step is carried out under conventional conditions for gas adsorption on activated carbon. Temperatures and pressures within the preferred limits listed above for the hydrogen chloride addition step are satisfactory. Any activated charcoal of animal or vegetable origin can be used. Silica gel or other such adsorptive material can also be used but these are generally less suitable.

The following examples are illustrative of operation within preferred limits of process conditions.

EXAMPLE 1

A steel tube 61 cm. long and having a 5.1 cm. inside diameter was packed with alternate layers of glass wool and pure anhydrous $AlCl_3$ powder (total weight 65 g.). Impure anhydrous hydrogen chloride from the cracking of ethylene dichloride was passed through the packed tube at 21° C. and 15.6 atmospheres at the rate of 20.5 g. HCl per minute. The effluent stream was divided and about half of it was passed through a similar tube filled with 683 g. of granular activated charcoal. After two hours of operation in this manner, samples of the feed stream, the effluent from the $AlCl_3$ tube, and the effluent from the charcoal tube were taken and analyzed with results as follows, concentrations of the unsaturated impurities and their reaction products being expressed in parts per million by volume:

| Component | Feed stream | After $AlCl_3$ | After charcoal |
|---|---|---|---|
| $C_2H_2$ | 400 | 5 | 1 |
| $C_2H_4$ | 77 | <1 | <1 |
| $CH_3CHCl_2$ | <1 | 355 | <1 |
| $CH_3CH_2Cl$ | 17 | 110 | <1 |

The experiment was continued for an extended period during which time the concentrations of impurities in the feed stream varied somewhat, but acetylene remained the major impurity while ethylene was present in lesser concentration. After two hours of continued running, the HCl feed rate was increased to 25.5 g. per minute. After two hours' running at this increased rate, samples were again taken for analysis as before with the following results:

| Component | Feed stream | After $AlCl_3$ | After charcoal |
|---|---|---|---|
| $C_2H_2$ | 1,000 | <1 | <1 |
| $C_2H_4$ | 184 | <1 | <1 |
| $CH_3CHCl_2$ | <1 | 515 | <1 |
| $CH_3CH_2Cl$ | 4 | 146 | <1 |

After running as above for several days, by which time the catalyst bed had contacted in total over a thousand times its weight of hydrogen chloride and the charcoal bed had twice been regenerated, samples were taken for analysis once more. The charcoal was regenerated by heating and purging with nitrogen.

| Component | Feed stream | After $AlCl_3$ | After charcoal |
|---|---|---|---|
| $C_2H_2$ | 320 | 4 | <1 |
| $C_2H_4$ | 56 | <1 | <1 |
| $CH_3CHCl_2$ | <1 | 750 | <1 |
| $CH_3CH_2Cl$ | 7 | 190 | <1 |

Experiments run as above using a technical grade of $AlCl_3$ powder instead of the pure material gave essentially the same results.

EXAMPLE 2

Impure anhydrous hydrogen chloride containing 12 parts per million by volume of vinyl chloride, in addition to the impurities listed in Example 1, was passed through the same $AlCl_3$ tube as in Example 1 under the same conditions of temperature, pressure and flowrate. The gas emerging from the $AlCl_3$ tube was found by analysis to contain less than 1 part per million of vinyl chloride.

EXAMPLE 3

A steel tube of 1.27 cm. inside diameter and 30.5 cm. in length was packed with glass wool and 14.7 g. of pure anhydrous $AlCl_3$ powder as in Example 1. A stream of impure HCl similar in composition to the feed previously used was passed through the packed tube at different pressures, temperatures, and rates. Samples of the effluent were analyzed for ethylene and acetylene.

| Pressure atmospheres | Temp., °C. | Contact time, seconds | $C_2H_2$ Feed | $C_2H_2$ Effluent | $C_2H_4$ Feed | $C_2H_4$ Effluent |
|---|---|---|---|---|---|---|
| 14.6 | 25 | 30 | 1,218 | 5 | 615 | <1 |
| 7.8 | 25 | 30 | 1,218 | 3 | 615 | <1 |
| 4.4 | 25 | 30 | 1,218 | 120 | 615 | <1 |
| 13.2 | 0.5 | 30 | 1,075 | 6 | 400 | <1 |
| 7.8 | 0.5 | 30 | 1,025 | 30 | 510 | <1 |
| 7.8 | 0.5 | 60 | 1,025 | 18 | 510 | <1 |

There was some loss of activity of the $AlCl_3$ during the low temperature runs which was apparently caused by deposition on the catalyst of some tarry reaction products.

EXAMPLE 4

To illustrate the ineffectiveness of activated charcoal alone to remove unsaturated hydrocarbon impurities, the same hydrogen chloride stream was passed through the same bed of charcoal as used in Example 1 under the same conditions but with no contact with $AlCl_3$.

| Component | Feed | Effluent |
|---|---|---|
| Acetylene | 905 | 719 |
| Ethylene | 300 | 279 |
| Methane | 94 | 85 |
| Ethane | 33 | 30 |
| $CH_2=CHCl$ | 5 | 5 |
| $CH_3CH_2Cl$ | 11 | 1 |
| $CH_3CHCl_2$ | <1 | <1 |

EXAMPLE 5

Anhydrous hydrogen chloride contaminated with 200 parts per million by volume of propylene and 50 parts per million of allyl chloride is passed through a bed containing anhydrous aluminum chloride powder dispersed on glass wool. This treatment is carried out at 25° C. and 18 atmospheres at a flowrate corresponding to a residence time of 400 seconds, based on the empty tube. The levels of propylene and allyl chloride in the effluent streamed are found to be less than one part per million by volume.

I claim:
1. A process for purifying hydrogen chloride containing a contaminating amount up to 1% by volume of unsaturated hydrocarbons of 2–3 carbon atoms and the unsaturated monochloro derivatives thereof which comprises contacting said hydrogen chloride in the gas phase under essentially anhydrous conditions with solid aluminum chloride at 0–100° C. and superatmospheric pressure for a time sufficient to effect essentially complete hydrochlorination of said unsaturated impurities and separating purified hydrogen chloride from the hydrochlorinated impurities.

2. The process of claim 1 wherein the contaminated hydrogen chloride is derived from the thermal dehydrochlorination of ethylene dichloride and contains a total of up to 0.5 percent by volume of acetylene, ethylene and vinyl chloride.

3. The process of claim 1 wherein the hydrochlorination temperature is 10–40° C.

4. The process of claim 1 wherein the contaminated hydrogen chloride is derived from the thermal dehydrochlorination of ethylene dichloride and contains a total of up to 0.5 percent by volume of acetylene, ethylene and vinyl chloride and the hydrochlorination is carried out at 10–40° C. and at superatmospheric pressure of at least five atmospheres.

5. The process of claim 1 or 4 wherein the hydrogen chloride after contacting with aluminum chloride is contacted with an activated charcoal adsorbent at 10–40° C. and 5–50 atmospheres.

6. The process of claim 1 wherein the hydrochlorination contact time is 5–600 seconds.

7. The process of claim 4 wherein the hydrochlorination pressure is 5–50 atmospheres.

References Cited

UNITED STATES PATENTS

| | | | |
|---|---|---|---|
| 3,345,421 | 10/1967 | Brown | 260—663 |
| 2,196,246 | 4/1940 | Brown et al. | 23—154 |
| 2,282,712 | 5/1942 | Engs et al. | 23—154 XR |
| 2,408,950 | 10/1946 | Pines et al. | 23—154 XR |
| 2,486,485 | 11/1949 | Latchum | 23—154 XR |
| 2,491,786 | 12/1949 | Wenrich | 23—154 XR |
| 2,705,732 | 4/1955 | Braconier | 23—154 XR |
| 2,827,129 | 3/1958 | Gould | 23—154 XR |
| 3,067,009 | 12/1962 | Murib et al. | 23—2 XR |
| 3,278,266 | 10/1966 | Welch et al. | 23—154 |

EDWARD STERN, *Primary Examiner.*

U.S. Cl. X.R.

252—411; 260—654, 663